(12) United States Patent
Ono (10) Patent No.: US 9,262,379 B2
(45) Date of Patent: Feb. 16, 2016

(54) MATRIX CALCULATION DEVICE, MATRIX CALCULATION METHOD, AND STORAGE MEDIUM HAVING MATRIX CALCULATION PROGRAM STORED THEREON

(71) Applicant: CASIO COMPUTER CO., LTD., Shibuya-ku, Tokyo (JP)

(72) Inventor: Manato Ono, Wako (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 416 days.

(21) Appl. No.: 13/846,752

(22) Filed: Mar. 18, 2013

(65) Prior Publication Data

US 2013/0262550 A1    Oct. 3, 2013

(30) Foreign Application Priority Data

Mar. 27, 2012   (JP) ................. 2012-070562

(51) Int. Cl.
*G06F 13/00*   (2006.01)
*G06F 17/16*   (2006.01)
*G09B 5/02*    (2006.01)

(52) U.S. Cl.
CPC . *G06F 17/16* (2013.01); *G09B 5/02* (2013.01)

(58) Field of Classification Search
CPC .......... G09B 19/025; G09B 7/02; G09B 5/02; G06F 15/025; G06F 15/0225; G06F 17/10; G06F 17/16

USPC ......................................................... 708/162
See application file for complete search history.

(56) References Cited

FOREIGN PATENT DOCUMENTS

| JP | 2004-213299 A | 7/2004 |
|---|---|---|
| JP | 2007-287185 A | 11/2007 |

OTHER PUBLICATIONS

Extended European Search Report (EESR) dated Aug. 8, 2013 (in English) in counterpart European Application No. 13161220.2.
A.C. Aitken; "Determinants and Matrices, Third Edition"; 1944; Oliver and Boyd; Edinburgh and London; New York: Interscience Publishers, Inc.; Section 11: "Partitioned matrices and multiplication"; pp. 21-27.

*Primary Examiner* — Tan V. Mai
(74) *Attorney, Agent, or Firm* — Holtz, Holtz & Volek PC (57) ABSTRACT

A matrix calculation device includes a first partition position display unit configured to distinguishably display a partition position of the one matrix partitioned by the matrix partitioning unit, a partition position determination unit configured to determine, based on a partition position of the one matrix distinguishably displayed by the first partition position display unit and a definition of a product of matrices, a partition position of the other matrix, and a second partition position display unit configured to distinguishably display the partition position of the other matrix determined by the partition position determination unit.

8 Claims, 9 Drawing Sheets

FIG.1

FIG.3A $$AB = \begin{bmatrix} 2 & 1 & 1 & 0 \\ 4 & 3 & 0 & 1 \\ 0 & 0 & 2 & 1 \\ 0 & 0 & 1 & 0 \end{bmatrix} \times \begin{bmatrix} 1 & 1 & 1 & 0 \\ 3 & 2 & 0 & 1 \\ 0 & 0 & 2 & 1 \\ 0 & 0 & 1 & 0 \end{bmatrix}$$

FIG.3B $$AB = \begin{bmatrix} 2 & 1 & 1 & 0 \\ 4 & 3 & 0 & 1 \\ 0 & 0 & 2 & 1 \\ 0 & 0 & 1 & 0 \end{bmatrix} \times \begin{bmatrix} 1 & 1 & 1 & 0 \\ 3 & 2 & 0 & 1 \\ 0 & 0 & 2 & 1 \\ 0 & 0 & 1 & 0 \end{bmatrix}$$

FIG.3C $$AB = \begin{bmatrix} 2 & 1 & 1 & 0 \\ 4 & 3 & 0 & 1 \\ 0 & 0 & 2 & 1 \\ 0 & 0 & 1 & 0 \end{bmatrix} \times \begin{bmatrix} 1 & 1 & 1 & 0 \\ 3 & 2 & 0 & 1 \\ \hline 0 & 0 & 2 & 1 \\ 0 & 0 & 1 & 0 \end{bmatrix}$$

FIG.3J $$AB = \begin{bmatrix} A_{11} & I \\ 0 & A_{22} \end{bmatrix} \times \begin{bmatrix} B_1 \\ B_2 \end{bmatrix}$$

A, d3, B, d1, d2, 17

FIG.3K $$AB = \begin{bmatrix} A_{11} \cdot B_1 + B_2 \\ A_{22} \cdot B_2 \end{bmatrix}$$

P, 17

FIG.3L $$AB = \begin{bmatrix} \begin{bmatrix} 2 & 1 \\ 4 & 3 \end{bmatrix} \cdot \begin{bmatrix} 1 & 1 & 1 & 0 \\ 3 & 2 & 0 & 1 \end{bmatrix} + \begin{bmatrix} 0 & 0 & 2 & 1 \\ 0 & 0 & 1 & 0 \end{bmatrix} \\ \begin{bmatrix} 2 & 1 \\ 1 & 0 \end{bmatrix} \cdot \begin{bmatrix} 0 & 0 & 2 & 1 \\ 0 & 0 & 1 & 0 \end{bmatrix} \end{bmatrix}$$

$A_{11}$, $B_1$, $B_2$, $A_{22}$, $B_2$, 17

FIG.4A $$AB = \begin{bmatrix} 2 & 1 & 1 & 0 \\ 4 & 3 & 0 & 1 \\ 0 & 0 & 2 & 1 \\ 0 & 0 & 1 & 0 \end{bmatrix} \times \begin{bmatrix} 1 & 1 & 1 & 0 \\ 3 & 2 & 0 & 1 \\ 0 & 0 & 2 & 1 \\ 0 & 0 & 1 & 0 \end{bmatrix}$$

FIG.4B $$AB = \begin{bmatrix} 2 & 1 & 1 & 0 \\ 4 & 3 & 0 & 1 \\ 0 & 0 & 2 & 1 \\ 0 & 0 & 1 & 0 \end{bmatrix} \times \begin{bmatrix} 1 & 1 & 1 & 0 \\ 3 & 2 & 0 & 1 \\ 0 & 0 & 2 & 1 \\ 0 & 0 & 1 & 0 \end{bmatrix}$$

FIG.4C $$AB = \begin{bmatrix} 2 & 1 & & \mathbf{I} & \\ 4 & 3 & & & \\ & \mathbf{0} & & 2 & 1 \\ & & & 1 & 0 \end{bmatrix} \times \begin{bmatrix} 1 & 1 & 1 & 0 \\ 3 & 2 & 0 & 1 \\ 0 & 0 & 2 & 1 \\ 0 & 0 & 1 & 0 \end{bmatrix}$$

FIG.4D $$AB = \begin{bmatrix} A_{11} & I \\ 0 & A_{22} \end{bmatrix} \times \begin{bmatrix} B_{11} & I \\ 0 & B_{22} \end{bmatrix}$$

FIG.4E $$AB = \begin{bmatrix} A_{11} \cdot B_{11} & A_{11} \cdot B_{22} \\ 0 & A_{22} \cdot B_{22} \end{bmatrix}$$

FIG.5

$$AB = \begin{bmatrix} 1 & 2 & 4 & 5 & 1 \\ 0 & 0 & 1 & 1 & 0 \\ 0 & 0 & 2 & 0 & 1 \end{bmatrix} \times \begin{bmatrix} -1 & 0 \\ 0 & -1 \\ 1 & -2 \\ 1 & 0 \\ 0 & 1 \end{bmatrix}$$

MATRIX CALCULATION DEVICE, MATRIX CALCULATION METHOD, AND STORAGE MEDIUM HAVING MATRIX CALCULATION PROGRAM STORED THEREON

CROSS-REFERENCE TO RELATED APPLICATIONS

This application is based upon and claims the benefit of priority from prior Japanese Patent Application No. 2012-070562, filed Mar. 27, 2012, the entire contents of which are incorporated herein by reference.

BACKGROUND OF THE INVENTION

1. Field of the Invention

The present invention relates to a matrix calculation device, matrix calculation method, and storage medium having a matrix calculation program stored thereon, each of which is used to learn a calculation of the matrix product.

2. Description of the Related Art

In recent years, scientific electronic calculators capable of displaying various formulae described in mathematics textbooks in accordance with the forms as they are (hereinafter referred to as "natural mathematical display") have become widespread as instructional tools. Further, a matrix calculation function is also incorporated in the scientific electronic calculator compatible with natural mathematical display.

Now, there is a matrix calculation as one of matrix learning items, and a calculation of a large matrix can be carried out by simplification using partitioned matrices. The partitioned matrices are found in many textbooks, and students learn that a matrix calculation is simplified by appropriately changing the matrices into partitioned matrices. However, it has been difficult for a beginner to determine at which part of a matrix calculating formula the partition should be carried out, and find in what procedure the calculation after changing the matrices into partitioned matrices should be carried out.

In a conventional scientific electronic calculator, in a state where a multiplication result of a matrix A multiplied by a matrix B (matrix A×matrix B) is displayed as a matrix calculating formula and matrix of the solution, when an arbitrary element of matrix elements of the displayed solution is specified, matrix elements in the matrix calculating formula used for calculating the specified matrix element of the solution are distinguishably displayed. Thereby, a matrix calculation device which makes it possible easily learn by what combination of a plurality of matrix elements of each of the matrices the calculation is carried out in the process of the calculation of the product of matrices is contrived.

In the conventional scientific electronic calculator or the like, although the matrix calculation function is incorporated, it is not possible to learn a procedure for efficiently carrying out a calculation by using partitioned matrices in calculating the product of large matrices.

BRIEF SUMMARY OF THE INVENTION

Accordingly, it is an object of the present invention to provide a matrix calculation device, matrix calculation method, and storage medium having a matrix calculation program stored thereon, by which it is made possible to learn a procedure for efficiently carrying out a calculation by using partitioned matrices in calculating the product of matrices.

According to one aspect of the present invention, there is provided a matrix calculation device comprising: a matrix multiplication formula display unit configured to display a matrix multiplication formula including a left matrix having matrix elements of a plurality of columns, a right matrix having matrix elements of a plurality of rows, and a multiplication sign between the left matrix and the right matrix on a display section; a matrix partitioning unit configured to partition one matrix of the matrix multiplication formula displayed by the matrix multiplication formula display unit into a plurality of minors in accordance with a user operation; a first partition position display unit configured to distinguishably display a partition position of the one matrix partitioned by the matrix partitioning unit; a partition position determination unit configured to determine, based on a partition position of the one matrix distinguishably displayed by the first partition position display unit and a definition of a product of matrices, a partition position of the other matrix; and a second partition position display unit configured to distinguishably display the partition position of the other matrix determined by the partition position determination unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3A is a view showing a partitioned matrix calculation/display operation (part 1) of a first example concomitant with the matrix calculation processing to be carried out by the touchpanel information terminal device (tablet computer 10P) 10;

FIG. 3B is a view showing a partitioned matrix calculation/display operation (part 2) of the first example concomitant with the matrix calculation processing to be carried out by the touchpanel information terminal device (tablet computer 10P) 10;

FIG. 3C is a view showing a partitioned matrix calculation/display operation (part 3) of the first example concomitant with the matrix calculation processing to be carried out by the touchpanel information terminal device (tablet computer 10P) 10;

DETAILED DESCRIPTION OF THE INVENTION

Hereinafter, an embodiment of the present invention will be described with reference to the drawings.

Figure 1:
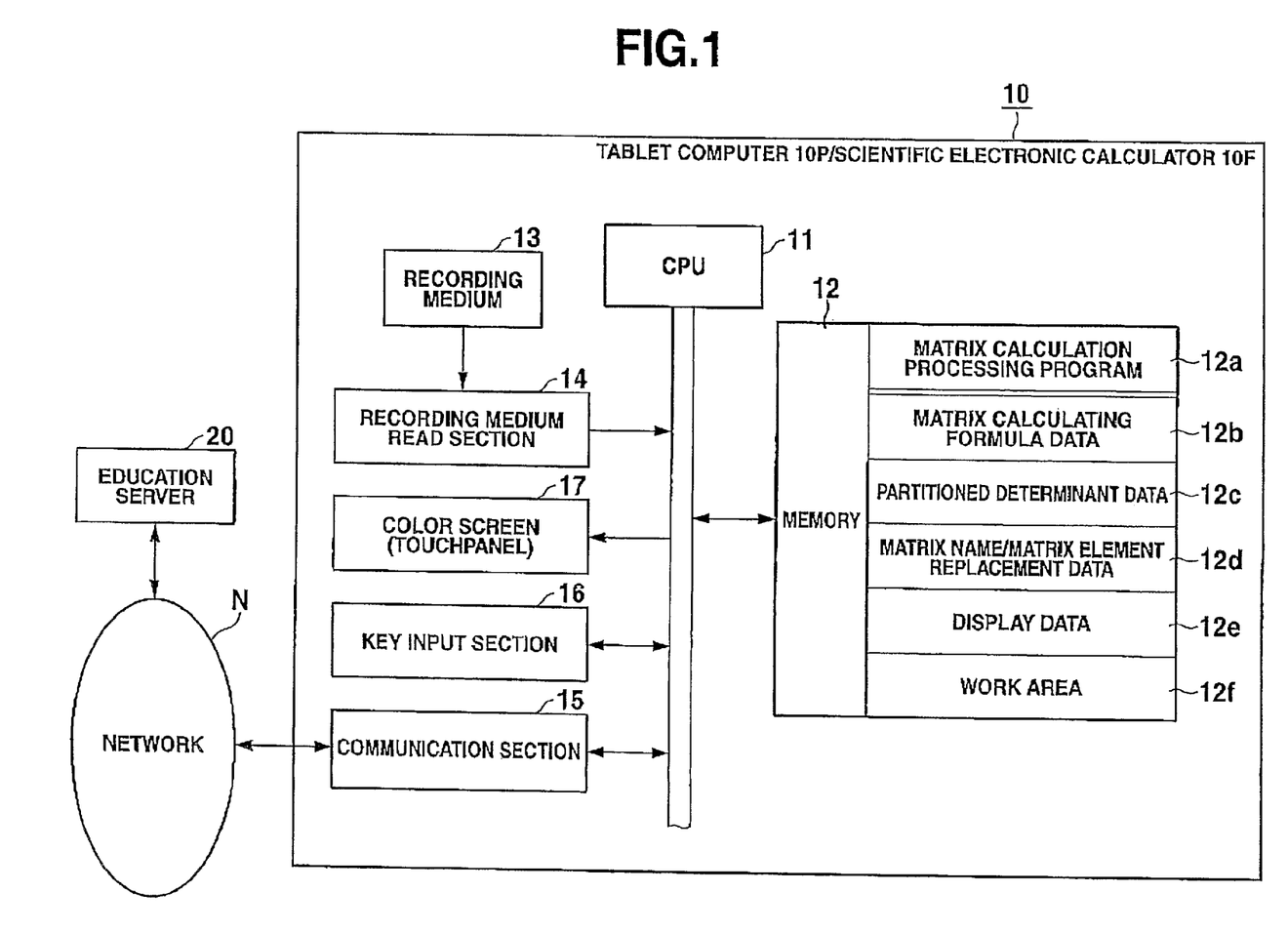
FIG. 1 is a block diagram showing the configuration of an electronic circuit of a touchpanel information terminal device 10 according to an embodiment of a matrix calculation device of the present invention.

FIG. 1 is a block diagram showing the configuration of an electronic circuit of a touchpanel information terminal device 10 according to an embodiment of a matrix calculation device of the present invention.

This touchpanel information terminal device 10 is configured as a tablet computer 10P or a scientific electronic calculator 10F, or the like.

The electronic circuit of the touchpanel information terminal device (tablet computer 10P) is provided with a CPU 11 which is a computer. The CPU 11 controls an operation of each circuit section by using the memory 12 as a work area in accordance with a terminal control program stored in advance in a memory 12 or a terminal control program read from an external recording medium 13 such as a memory card or the like into the memory 12 through a recording medium read section 14 or a terminal control program read from a web server (education server in this case) 20 on a communication network into the memory 12 through a communication section 15.

As the terminal control program to be stored in the memory 12, a matrix calculation processing program 12a read from the external recording medium 13 or downloaded from the education server 20 is stored in addition to a communication control program configured communicate with various external electronic devices through the communication section 15, and various application programs configured to carry out text processing, table processing, image/sound reproduction processing, mail processing, operation processing, and the like. The matrix calculation processing program 12a is an educational program used to learn a procedure for efficiently calculating the product of matrices by using partitioned matrices.

The terminal control program is started in accordance with a key input signal corresponding to a user operation from a key input section 16 or a touch input signal corresponding to a user operation from a touchpanel color display section 17 or a communication signal received from outside through the communication section 15.

Further, in the memory 12, a matrix calculating formula data area 12b, partitioned determinant data area 12c, matrix name/matrix element replacement data area 12d, display data area 12e, work area 12f, and the like are secured as storage areas for various operations.

In the matrix calculating formula data area 12b, a matrix calculating formula input by handwriting (mathematical formula recognition processing) or key-input is stored.

In the partitioned determinant data area 12c, a calculating formula of the product of partitioned matrices created in accordance with the matrix calculation processing program 12a is stored when the calculating formula stored in the matrix calculating formula data area 12b is a calculating formula of a product of matrices.

In the matrix name/matrix element replacement data area 12d, a matrix name of each of partitioned minors, and matrix elements included in the minor, are stored in correlated with each other with respect to the calculating formula of the product of partitioned matrices stored in the partitioned determinant data area 12c. It should be noted that a matrix name of each of the minors constituting the partitioned matrices is formed by adding a subscript corresponding to a matrix position of each of the minors in the partitioned matrix to a matrix name of the partitioned matrix to which the minor belongs.

The display data area 12e includes a storage area of color bit map data corresponding to a display screen area of the touchpanel color display section 17, and display screen data created in accordance with a program currently being executed is stored in this storage area 12e.

As described above, the memory 12, recording medium read section 14, communication section 15, key input section 16, and touchpanel color display section 17 are connected to the CPU 11, thereby constituting the information terminal device 10.

Further, this information terminal device 10 includes a function of creating partitioned matrices on the basis of a definition of a product of matrices, and displaying the created partitioned matrices with respect to a calculating formula of a product of matrices input by the user and displayed on the screen, function of displaying minors of the created partitioned matrices by replacing matrix elements included in the minors with matrix names (minor names) of the minors, function of replacing a unit matrix with a unit matrix symbol "I", and replacing a zero matrix with a zero matrix symbol "0" in replacing the minors with the minor names, and displaying the resultants, function of executing a calculation of a product of the partitioned matrices in a state where the minors of the partitioned matrices are respectively replaced with the minor names, unit matrix symbol "1", and zero matrix symbol "0", and function of converting, after executing the calculation of the product of the partitioned matrices, the minor names constituting the calculation result into the matrix elements before being replaced with the minor names, and displaying the resultant matrix elements.

In the information terminal device 10 configured in the manner described above, the CPU 11 controls operations of the circuit sections in accordance with instructions described in the terminal control program (12a), and the software and hardware cooperate with each other to operate, whereby a creation function, calculation function, and display function of the partitioned matrices are realized with respect to the calculating formula of the product of the matrices to be described in the following operation explanation.

Next, an operation of the information terminal device 10 provided with a creation function, calculation function, and display function of the partitioned matrices, and configured as described previously will be described below.

Figure 2A:
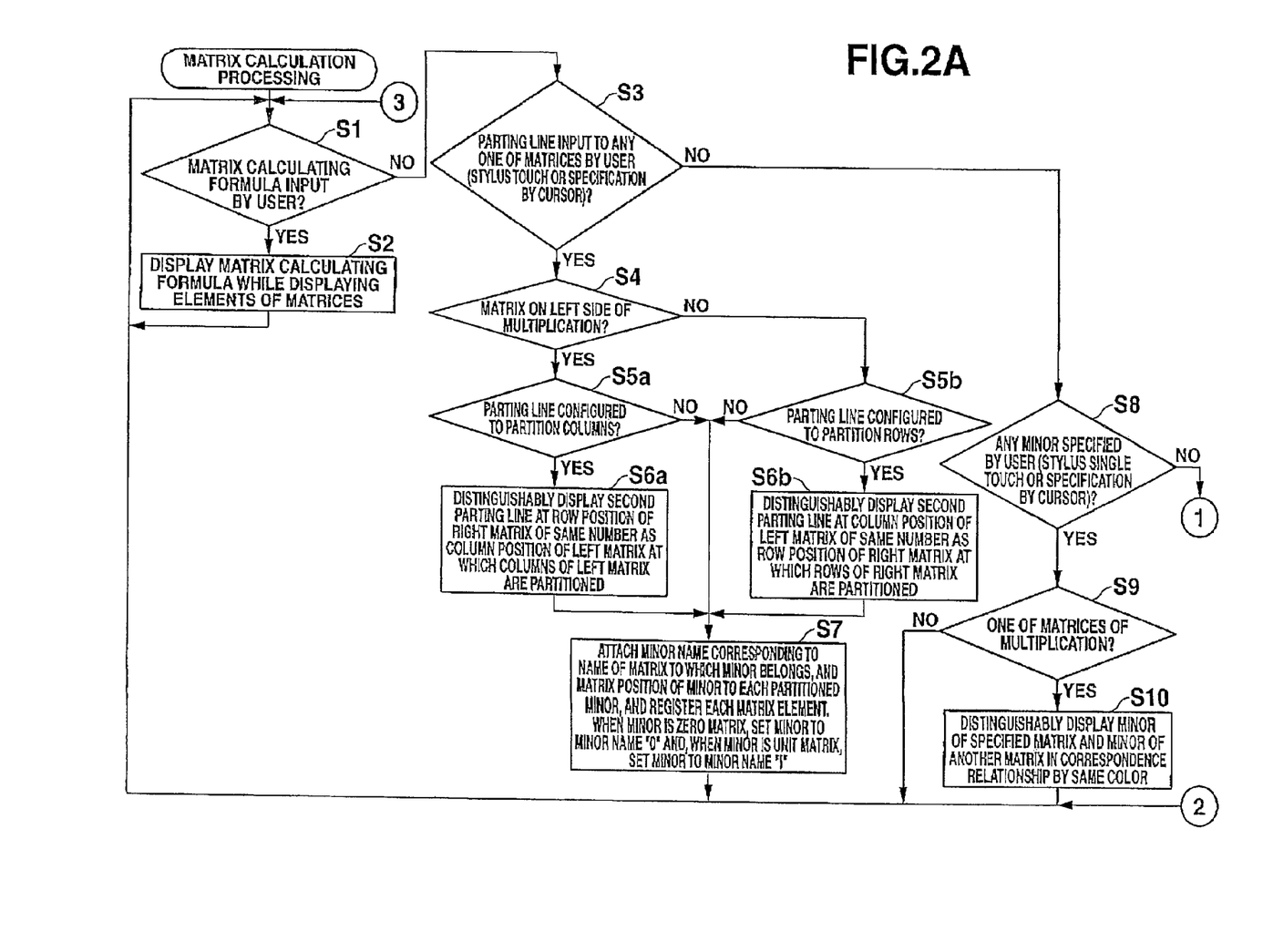
FIG. 2A is a flowchart showing matrix calculation processing (part 1) to be carried out by the touchpanel information terminal device (tablet computer 10P) 10.
Figure 2B:
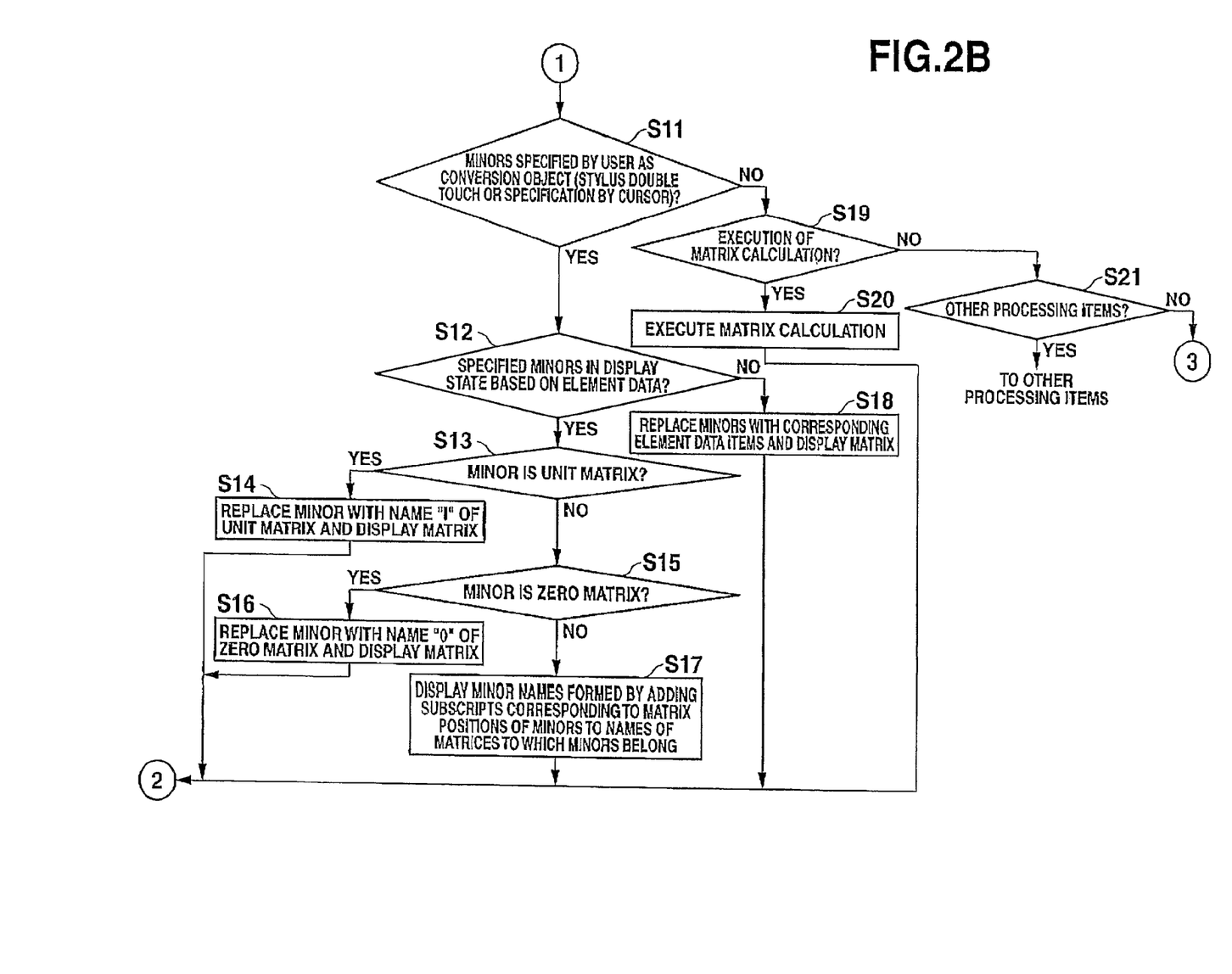
FIG. 2B is a flowchart showing matrix calculation processing (part 2) to be carried out by the touchpanel information terminal device (tablet computer 10P) 10.

Each of FIG. 2A, and FIG. 2B is a flowchart showing matrix calculation processing to be carried out by the touchpanel information terminal device (tablet computer 10P) 10.

First Example

Each of FIGS. 3A to 3L is a view showing a partitioned matrix calculation/display operation of a first example concomitant with the matrix calculation processing to be carried out by the touchpanel information terminal device (tablet computer 10P) 10.

When, for example, the matrix calculation processing program 12a downloaded from the education server 20 and stored in the memory 12 is started in order to carry out learning of a matrix calculation, the information terminal device 10 is brought into an input waiting state of a matrix calculating formula.

When matrix elements of a square matrix A (4×4) on the left side, a multiplication sign "×", and matrix elements of a square matrix B (4×4) on the right side are sequentially input as a calculating formula of a product of the matrices A and B as shown in FIG. 3A in accordance with a user operation on the touchpanel display section 17 or on the key input section 16, the input calculating formula is stored in the matrix calculating formula data area 12b, and is displayed on the touchpanel display section 17 (steps S1 and S2).

In the calculating formula of the product of the matrices A and B, when a first parting line d1 configured to partition the left matrix A into minors $A_1$ and $A_2$ each of which includes two columns is input and displayed in order to carry out a calculation using partitioned matrices as shown in FIG. 3B by using a stylus P or by a cursor operation (step S3 [Yes]), it is determined that the matrix to which the first parting line d1 is input is matrix A on the left side of the multiplication (step S4 [Yes]), and it is further determined that the first parting line d1 is a parting line configured to partition the columns (step S5a [Yes]).

Then, on the basis of a definition of a product of matrices stating that the number of columns of a left matrix and the number of rows of a right matrix be equal to each other, a second parting line d2 configured to partition the right matrix B into minors $B_1$ and $B_2$ each of which includes two rows is distinguishably displayed (step S6a). The calculating formula of partitioned matrices A and B is stored in the partitioned determinant data area 12c.

Here, matrix elements of minors $A_1$, $A_2$, $B_1$, and $B_2$ are correlated with minor names "$A_1$", "$A_2$", "$B_1$", and "$B_2$" of minors $A_1$, $A_2$, $B_1$, and $B_2$ of partitioned matrices A and B, and are registered in the matrix name/matrix element replacement data area 12d. It should be noted that at this time, when the minor is a zero matrix, it is set to a minor name (zero matrix symbol) "0" and is registered and, when the minor is a unit matrix, it is set to a minor name (unit matrix symbol) "I" and is registered (step S7).

Thereby, in the calculating formula of the product of the matrices A and B, when the first parting line d1 is input to the left matrix A by the operation of the user (student), the second parting line d2 is input to the right matrix B at an appropriate position thereof and is displayed simultaneously with the input of the first parting line d1, whereby it is possible to create correct partitioned matrices A and B conforming to the definition of the product of matrices.

Figure 3D:
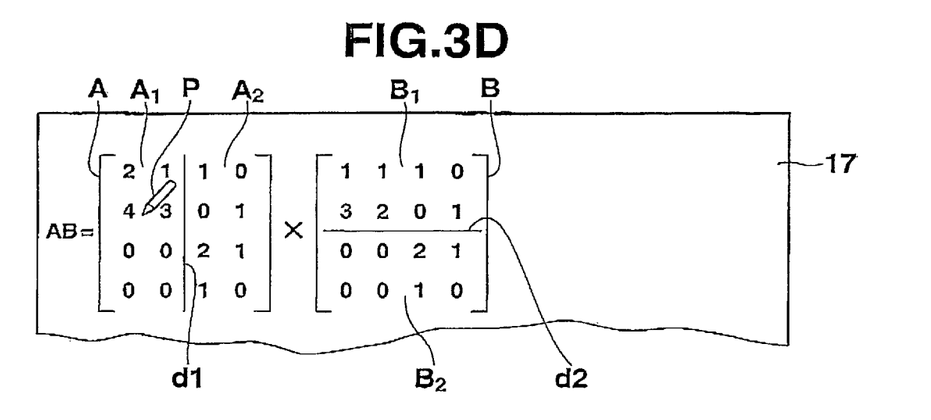
FIG. 3D is a view showing a partitioned matrix calculation/display operation (part 4) of the first example concomitant with the matrix calculation processing to be carried out by the touchpanel information terminal device (tablet computer 10P) 10.
Figure 3E:
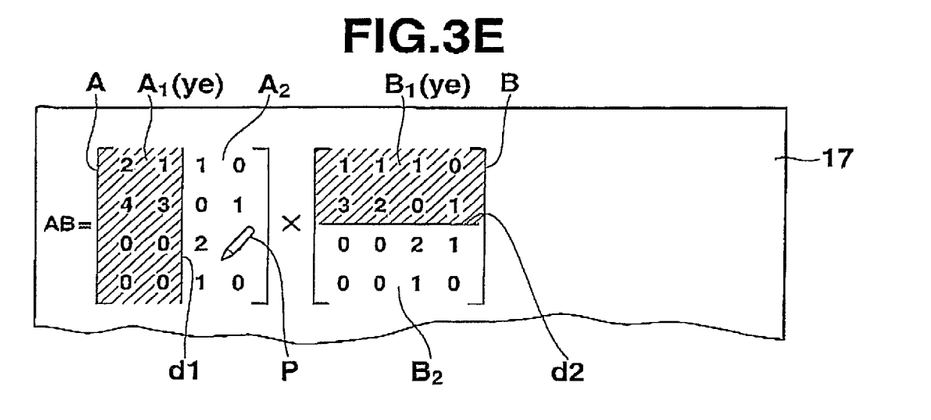
FIG. 3E is a view showing a partitioned matrix calculation/display operation (part 5) of the first example concomitant with the matrix calculation processing to be carried out by the touchpanel information terminal device (tablet computer 10P) 10.

After this, as shown in FIG. 3D, when minor $A_1$ of the left side partitioned matrix A is single-touched by the stylus P or is single-specified by the cursor (step S8 [Yes]), it is determined that the specified partitioned matrix A is one of the matrices of multiplication (step S9 [Yes]), and minor $A_1$ of the specified partitioned matrix A, and minor $B_1$ of partitioned matrix B which is in a correspondence relationship with minor $A_1$ of partitioned matrix A on the basis of the combination of multiplication are distinguishably displayed by the same yellow color (ye) as shown in FIG. 3E (step S10).

Figure 3F:
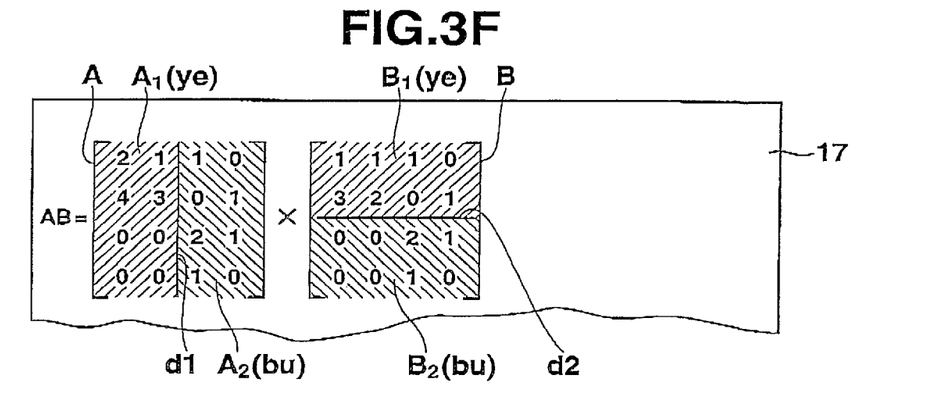
FIG. 3F is a view showing a partitioned matrix calculation/display operation (part 6) of the first example concomitant with the matrix calculation processing to be carried out by the touchpanel information terminal device (tablet computer 10P) 10.

Furthermore, when minor $A_2$ of the left side partitioned matrix A is single-touched by the stylus P or is specified by the cursor (step S8 [Yes]), like the previous case, it is determined that the specified partitioned matrix A is one of the matrices of multiplication (step S9 [Yes]), and minor $A_2$ of the specified partitioned matrix A, and minor $B_2$ of the partitioned matrix which is in a correspondence relationship with minor $A_2$ of partitioned matrix A on the basis of the combination of multiplication are distinguishably displayed by the same blue color (bu) as shown in FIG. 3F (step S10).

Thereby, in the created partitioned matrices A and B, the user (student) can easily and definitely learn by what combination minors $A_1$ and $A_2$ of the one partitioned matrix A should be multiplied by minors $B_1$ and $B_2$ of the other partitioned matrix B.

Figure 3G:
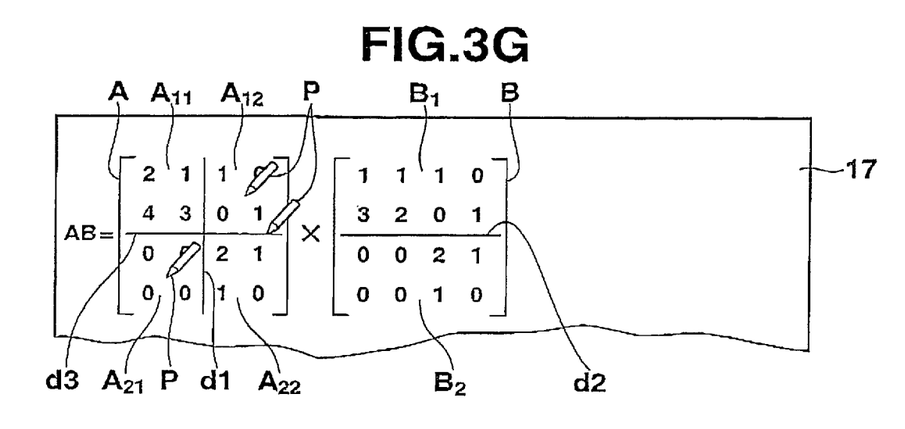
FIG. 3G is a view showing a partitioned matrix calculation/display operation (part 7) of the first example concomitant with the matrix calculation processing to be carried out by the touchpanel information terminal device (tablet computer 10P) 10.

After this, when a third parting line d3 configured to further partition the left partitioned matrix A into upper and lower parts each of which includes two rows is input and displayed in accordance with the user operation as shown in FIG. 3G (step S3 [Yes]), it is determined that the matrix to which the parting line d3 is input is matrix A on the left side of the multiplication (step S4 [Yes]), and it is further determined that the parting line d3 is not a parting line configured to partition the columns (step S5a [No]).

Then, matrix elements of minors $A_{11}$, $A_{12}$, $A_{21}$, and $A_{22}$ are correlated with minor names "$A_{11}$", "$A_{12}$", "$A_{21}$", and "$A_{22}$" of minors $A_{11}$, $A_{12}$, $A_{21}$, and $A_{22}$ of partitioned matrix A, and are registered in the matrix name/matrix element replacement data area 12d. At this time, minor $A_{12}$ is a unit matrix, and is hence set to minor name (unit matrix symbol) "I" to be registered, and minor $A_{21}$ is a zero matrix, and is hence set to minor name (zero matrix symbol) "0" to be registered (step S7).

Further, when minors $A_{12}$ and $A_{21}$ of the left partitioned matrix A are double-touched by the stylus 2 or are double-specified by the cursor (step S11 [Yes]), it is determined that specified minors $A_{12}$, and $A_{21}$ are in a display state based on the matrix elements (step S12 [Yes]).

Figure 3H:
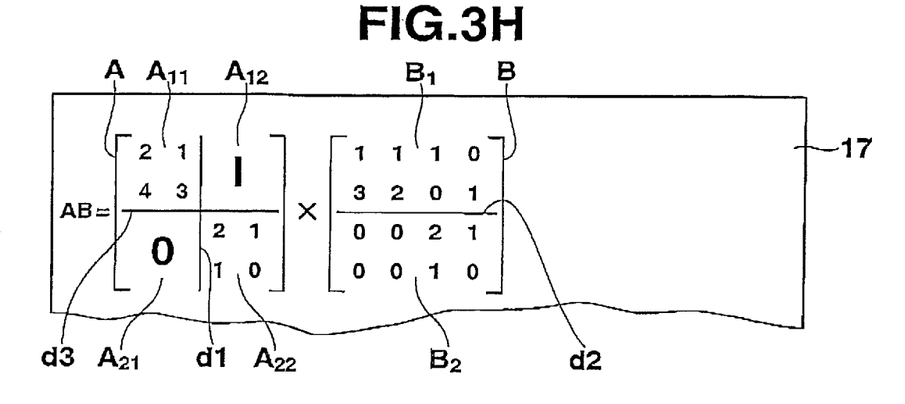
FIG. 3H is a view showing a partitioned matrix calculation/display operation (part 8) of the first example concomitant with the matrix calculation processing to be carried out by the touchpanel information terminal device (tablet computer 10P) 10.

Then, it is determined that specified minor $A_{12}$ of partitioned matrix A is a unit matrix (step S13 [Yes]) and, the matrix elements thereof are replaced with minor name (unit matrix symbol) "I" to be displayed as shown in FIG. 3H (step S14).

Further, it is determined that specified minor $A_{21}$ of partitioned matrix A is a zero matrix (step S15 [Yes]), and the matrix elements thereof are replaced with minor name (zero matrix symbol) "0" to be displayed as shown in FIG. 3H (step S16).

Figure 3I:
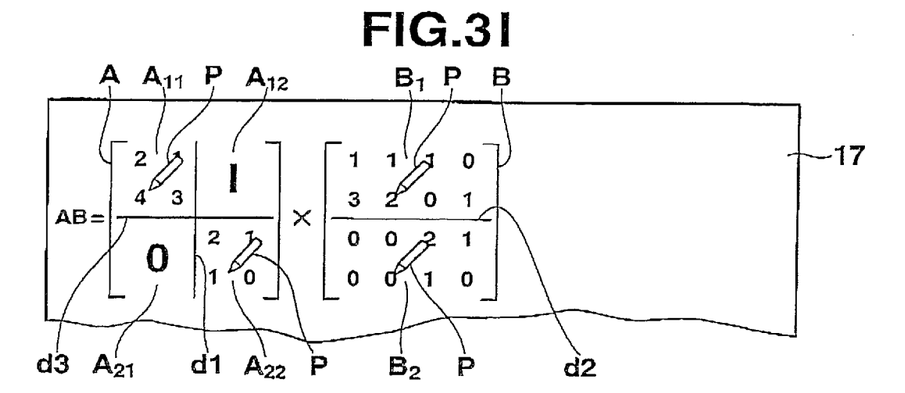
FIG. 3I is a view showing a partitioned matrix calculation/display operation (part 9) of the first example concomitant with the matrix calculation processing to be carried out by the touchpanel information terminal device (tablet computer 10P) 10.

Furthermore, as shown in FIG. 3I, each time minors $A_{11}$ and $A_{22}$ of the left partitioned matrix A, and minors $B_1$ and $B_2$ of the right partitioned matrix B are sequentially and individually double-touched by the stylus P or are double-specified by the cursor (step S11 [Yes]), it is determined like the previous case that minor $A_{11}$, $A_{21}$, $B_1$ or $B_2$ is in the display state based on the matrix elements (step S12 [Yes]).

Figure 3J:
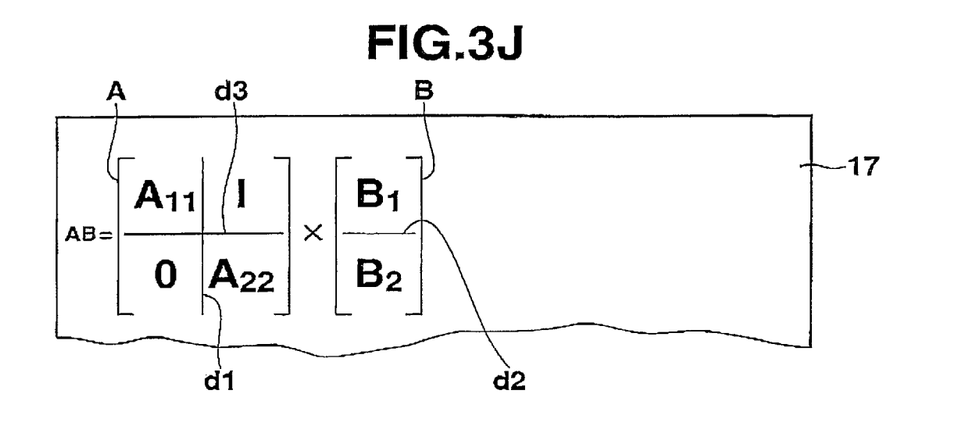
FIG. 3J is a view showing a partitioned matrix calculation/display operation (part 10) of the first example concomitant with the matrix calculation processing to be carried out by the touchpanel information terminal device (tablet computer 10P) 10.

Then, it is determined that each of specified minors $A_{11}$, $A_{22}$, $B_1$, and $B_2$ of partitioned matrices A and B is neither a unit matrix (step S13 [No]) nor a zero matrix (step S15 [No]) and, minors $A_{11}$, $A_{22}$, $B_1$, and $B_2$ are replaced with minor names "$A_{11}$", "$A_{22}$", "$B_1$", and "$B_2$" formed by adding subscripts corresponding to the matrix positions of the minors in partitioned matrix A or B to the matrix name "A" or "D" of partitioned matrix A or B to which minors $A_{11}$, $A_{22}$, and $B_2$ belong, and resultant minor names "$A_{11}$", "$A_{22}$", "$B_1$", and "$B_2$" are displayed as shown in FIG. 3J (step S17).

Thereby, it is possible for the user (student) to replace the created minors of partitioned matrices A and B with the minor names corresponding to the minors, further replace the unit matrix with the unit matrix symbol "I", and replace the zero matrix with the zero matrix symbol "0", whereby it is possible for the user (student) to display partitioned matrices A and B in a simplifying manner.

Figure 3K:
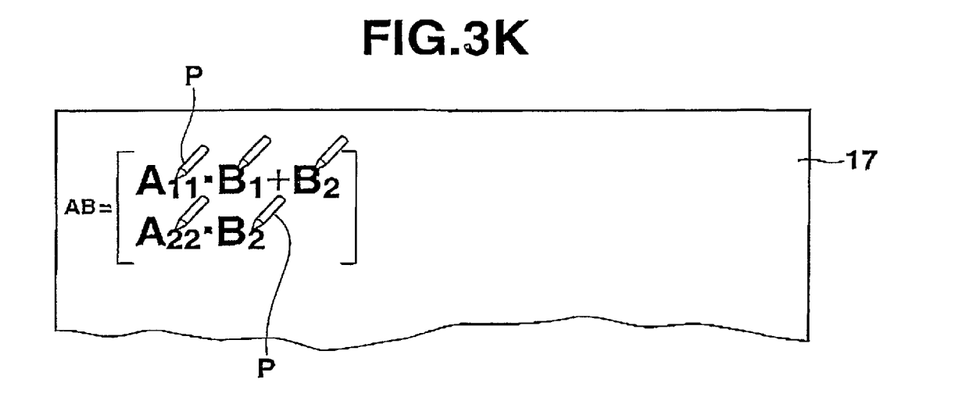
FIG. 3K is a view showing a partitioned matrix calculation/display operation (part 11) of the first example concomitant with the matrix calculation processing to be carried out by the touchpanel information terminal device (tablet computer 10P) 10.

Further, when an instruction to execute a matrix calculation is issued by stylus-touching an "execution" icon (not shown) displayed on the touchpanel display section 17 or by operating an execution key (step S19 [Yes]), multiplication is executed with the simplified partitioned matrices A and 5 kept as they are, and a calculation result is displayed as shown in FIG. 3K (step S20).

In the multiplication result of the simplified partitioned matrices A and B, each time minor names "$A_{11}$", "$B_1$", "$B_2$", "$A_{22}$", and "$B_2$" which are constituent elements of the multiplication result are sequentially and individually double-touched by the stylus P or are double-specified by the cursor (step S11 [Yes]), it is determined that specified minor name "$A_{11}$", "$B_1$", "$B_2$", "$A_{22}$" or "$B_2$" is not in the display state based on the matrix elements (step S12 [No]).

Figure 3L:
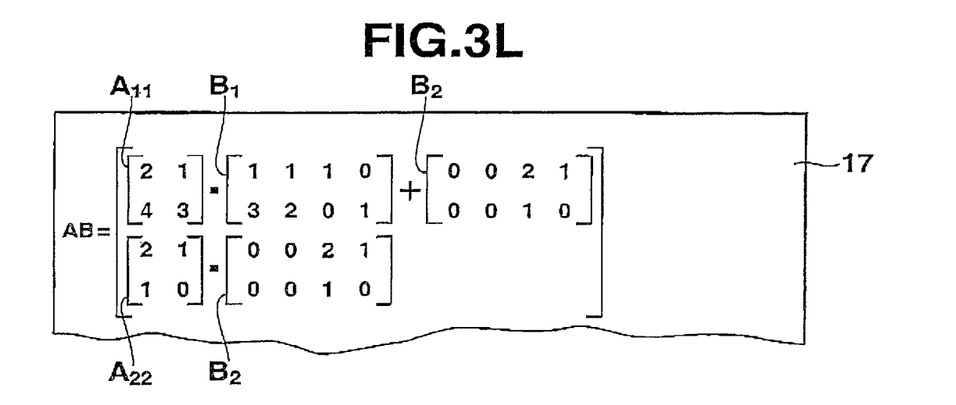
FIG. 3L is a view showing a partitioned matrix calculation/display operation (part 12) of the first example concomitant with the matrix calculation processing to be carried out by the touchpanel information terminal device (tablet computer 10P) 10.

Then, minor name "$A_{11}$", "$B_1$", "$B_2$", "$A_{22}$", and "$B_2$" which are constituent elements of the multiplication result of partitioned matrices A and B are each replaced with corresponding matrix elements registered in the matrix name/matrix element replacement data area 12d, and are displayed as shown in FIG. 3L (step S18).

Thereby, it is possible for the user (student) to easily learn, even when the user (student) is a beginner who cannot determine at which part of a determinant partition should be carried out, and cannot find the calculation procedure after changing the matrices into partitioned matrices, a procedure for efficiently carrying out a calculation by using partitioned matrices.

Second Example

Each of FIGS. 4A to 4E is a view showing a partitioned matrix calculation/display operation of a second example concomitant with the matrix calculation processing to be carried out by the touchpanel information terminal device (tablet computer 10P) 10.

Figure 4A:
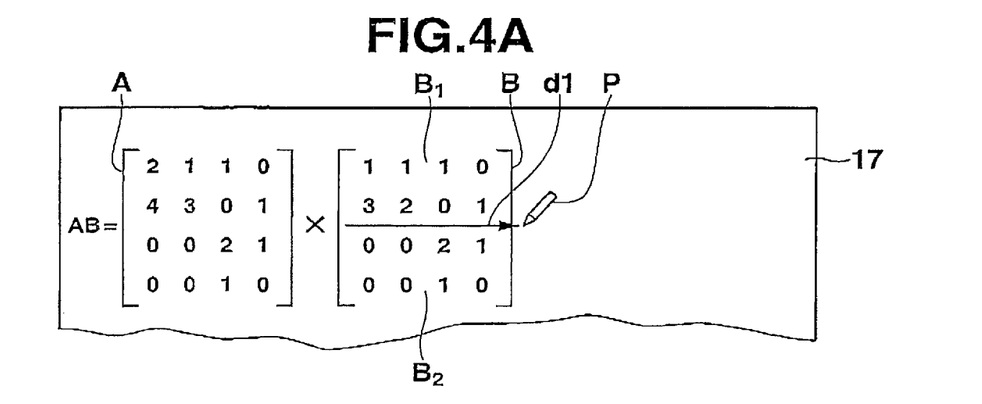
FIG. 4A is a view showing a partitioned matrix calculation/display operation (part 1) of a second example concomitant with the matrix calculation processing to be carried out by the touchpanel information terminal device (tablet computer 10P) 10.

In a state where matrix elements of a square matrix A (4×4) on the left side, a multiplication sign "×", and matrix elements of a square matrix B (4×4) on the right side are sequentially input as a calculating formula of a product of the matrices A and B as shown in FIG. 4A in accordance with a user operation on a touchpanel display section 17 or on a key input section (steps S1 and S2), when a first parting line d1 configured to partition the right matrix B into minors $B_1$ and $B_2$ each of which includes two rows is input and displayed in order to carry out a calculation using partitioned matrices by using a stylus P or by a cursor operation (step S3 [Yes]), it is determined that the matrix to which the first parting line d1 is input is not matrix A on the left side of the multiplication (is matrix B on the right side) (step S4 [No]), and it is further determined that the first parting line d1 is a parting line configured to partition the rows (step S5b [Yes]).

Figure 4B:
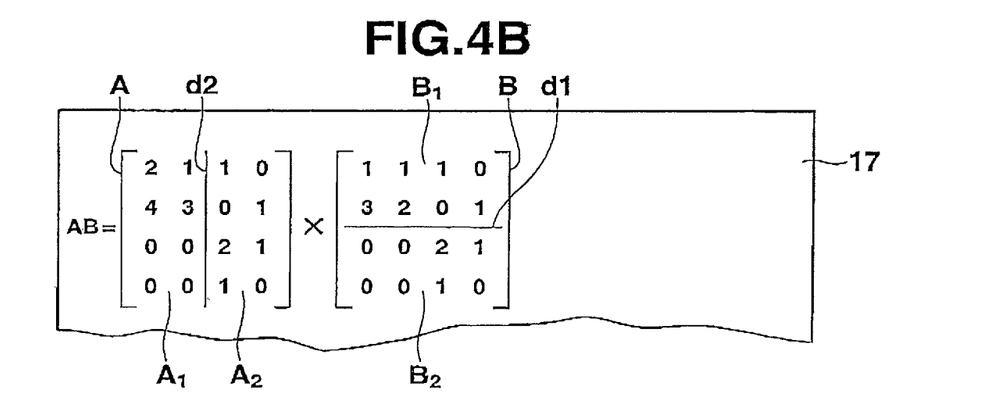
FIG. 4B is a view showing a partitioned matrix calculation/display operation (part 2) of the second example concomitant with the matrix calculation processing to be carried out by the touchpanel information terminal device (tablet computer 10P) 10.

Then, on the basis of a definition of a product of matrices stating that the number of columns of a left matrix and the number of rows of a right matrix be equal to each other, a second parting line d2 configured to partition the left matrix A into minors $A_1$ and $A_2$ each of which includes two columns is distinguishably displayed (step S6b). The calculating formula of partitioned matrices A and B is stored in a partitioned determinant data area 12c.

Here, matrix elements of minors $A_1$, $A_2$, $B_1$, and $B_2$ are correlated with minor names "$A_1$", "$A_2$", "$B_1$", and "$B_2$" of minors $A_1$, $A_2$, $B_1$, and $B_2$ of partitioned matrices A and B, and are registered in a matrix name/matrix element replacement data area 12d. It should be noted that at this time, when the minor is a zero matrix, it is set to a minor name (zero matrix symbol) "0" and is registered and, when the minor is a unit matrix, it is set to a minor name (unit matrix symbol) "I" and is registered (step S7).

Thereby, in the calculating formula of the product of the matrices A and B, when the first parting line d1 is input to the right matrix B by the operation of the user (student), the second parting line d2 is input to the left matrix A at an appropriate position thereof and is displayed simultaneously with the input of the first parting line d1, whereby it is possible to create correct partitioned matrices A and B conforming to the definition of the product of matrices.

Figure 4C:
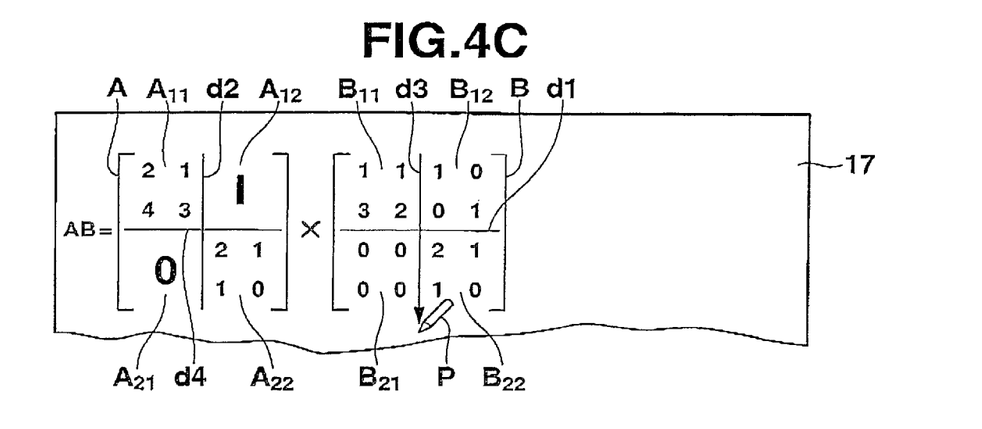
FIG. 4C is a view showing a partitioned matrix calculation/display operation (part 3) of the second example concomitant with the matrix calculation processing to be carried out by the touchpanel information terminal device (tablet computer 10P) 10.

After this, when a parting line d3 configured to further partition the right partitioned matrix B into right and left parts each of which includes two columns is input and displayed in accordance with the user operation as shown in FIG. 4C (step S3 [Yes]), it is determined that the matrix to which the parting line d3 is input is not matrix A on the left side of the multiplication (is matrix B on the right side) (step S4 [No]), and it is further determined that the parting line d3 is not a parting line configured to partition the rows (step S5b [No]).

Then, matrix elements of minors $B_{11}$, $B_{12}$, $B_{21}$, and $B_{22}$ are correlated with minor names "$B_{11}$", "$B_{12}$", "$B_{21}$", and "$B_{22}$" of minors $B_{11}$, $B_{12}$, $B_{21}$, and $B_{22}$ of partitioned matrix B, and are registered in the matrix name/matrix element replacement data area 12d. At this time, minor $B_{12}$ is a unit matrix, and is hence set to minor name (unit matrix symbol) "I" to be registered, and minor $B_{21}$ is a zero matrix, and is hence set to minor name (zero matrix symbol) "0" to be registered (step S7).

Furthermore, a parting line d4 configured to further partition the left partitioned matrix A into upper and lower parts each of which includes two rows is input and displayed in accordance with the user operation (step S3 [Yes]), it is determined that the matrix to which the parting line d4 is input is matrix A on the left side of the multiplication (step S4 [Yes]), and it is further determined that the parting line d4 is not a parting line configured to partition the columns (step S5a [No]).

Then, matrix elements of minors $A_{11}$, $A_{12}$, $A_{21}$, and $A_{22}$ are correlated with minor names "$A_{11}$", "$A_{12}$", "$A_{21}$", and "$A_{22}$" of minors $A_{11}$, $A_{12}$, $A_{21}$, and $A_{22}$ of partitioned matrix A, and are registered in the matrix name/matrix element replacement data area 12d. At this time, minor $A_{12}$ is a unit matrix, and is hence set to minor name (unit matrix symbol) "I" to be registered, and minor $A_{21}$ is a zero matrix, and is hence set to minor name (zero matrix symbol) "0" to be registered (step S7).

Further, when minors $A_{12}$ and $A_{21}$ of the left partitioned matrix A are double-touched by the stylus P or are double-specified by the cursor (step S11 [Yes]), it is determined that specified minors $A_{12}$, and $A_{21}$ are in a display state based on the matrix elements (step S12 [Yes]).

Then, it is determined that specified minor $A_{12}$ of partitioned matrix A is a unit matrix (step S13 [Yes]) and, the matrix elements thereof are replaced with minor name (unit matrix symbol) "I" to be displayed (step S14).

Further, it is determined that specified minor $A_{21}$ of partitioned matrix A is a zero matrix (step S15 [Yes]), and the matrix elements thereof are replaced with minor name (zero matrix symbol) "0" to be displayed (step S16).

Furthermore, each time minors $A_{11}$ and $A_{22}$ of the left partitioned matrix A, and minors $B_{11}$, $B_{12}$, $B_{21}$, and $B_{22}$ of the right partitioned matrix B are sequentially and individually double-touched by the stylus P or are double-specified by the cursor (step S11 [Yes]), it is determined like the previous case that minor $A_{11}$, $A_{21}$, $B_{11}$, $B_{12}$, $B_{21}$ or $B_{22}$ is in the display state based on the matrix elements (step S12 [Yes]).

Figure 4D:
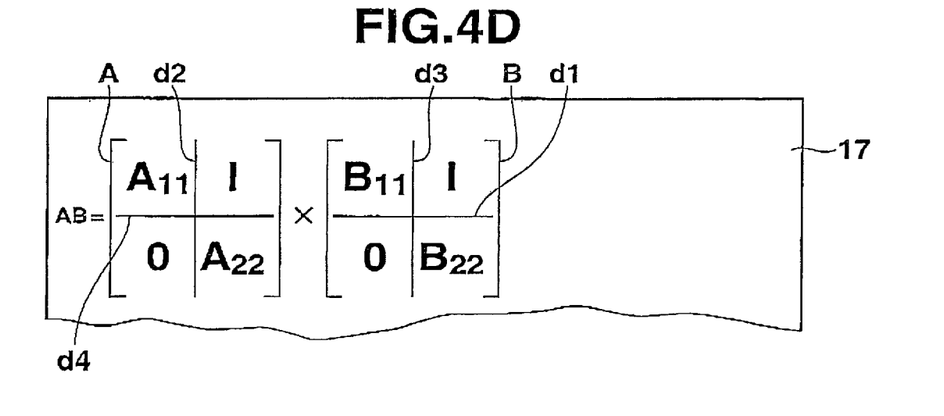
FIG. 4D is a view showing a partitioned matrix calculation/display operation (part 4) of the second example concomitant with the matrix calculation processing to be carried out by the touchpanel information terminal device (tablet computer 10P) 10.

Then, it is determined that each of specified minors $A_{11}$, $A_{22}$, $B_{11}$, and $B_{22}$ of partitioned matrices A and B is neither a unit matrix (stew S13 [No]) nor a zero matrix (step S15 [No]) and, minors $A_{11}$, $A_{22}$, $B_{11}$, and $B_{22}$ are replaced with minor names "$A_{11}$", "$A_{22}$", "$B_{11}$", and "$B_{29}$" formed by adding subscripts corresponding to the matrix positions of the minors in partitioned matrix A or B to the matrix name "A" or "B" of partitioned matrix A or B to which minors $A_{11}$, $A_{22}$, $B_{11}$, and $B_{22}$ belong, and resultant minor names "$A_{11}$", "$A_{22}$", "$B_{11}$", and "$B_{22}$" are displayed as shown in FIG. 4D (step S17).

Further, it is determined that specified minor $B_{12}$ of partitioned matrix B is a unit matrix (step S13 [Yes]) and, the matrix elements thereof are replaced with minor name (unit matrix symbol) "I" to be displayed (step S14).

Furthermore, it is determined that specified minor $B_{21}$ of partitioned matrix B is a zero matrix (step S15 [Yes]), and the matrix elements thereof are replaced with minor name (zero matrix symbol) "0" to be displayed (step S16).

Thereby, it is possible for the user (student) to replace the created minors of partitioned matrices A and B with the minor names corresponding to the minors, further replace the unit matrix with the unit matrix symbol "I", and replace the zero matrix with the zero matrix symbol "0", whereby it is possible for the user (student) to display partitioned matrices A and B in a simplifying manner.

Figure 4E:
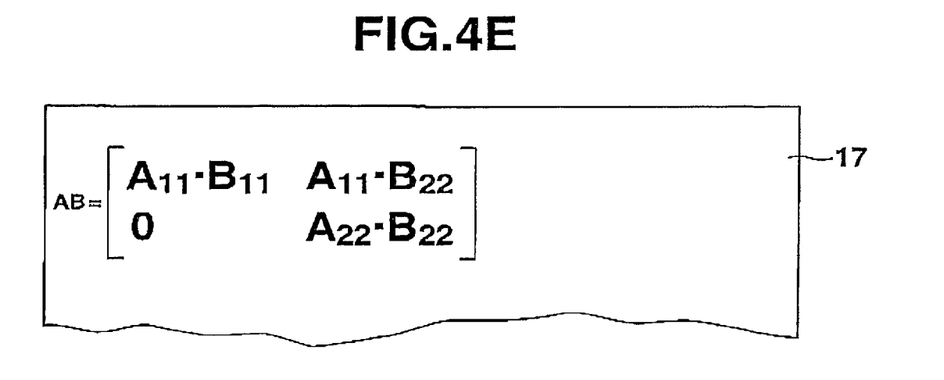
FIG. 4E is a view showing a partitioned matrix calculation/display operation (part 5) of the second example concomitant with the matrix calculation processing to be carried out by the touchpanel information terminal device (tablet computer 10P) 10.

Further, when an instruction to execute a matrix calculation is issued by stylus-touching an "execution" icon (not shown) displayed on the touchpanel display section 17 or by operating an execution key (step S19 [Yes]), multiplication is executed with the simplified partitioned matrices A and B kept as they are, and a calculation result is displayed as shown in FIG. 4E (step S20).

In the multiplication result of the simplified partitioned matrices A and B, each time minor names "$A_{11}$", "$B_{11}$", "$A_{11}$", "$B_{22}$", "$A_{22}$", and "$B_{22}$" which are constituent elements of the multiplication result are sequentially and individually double-touched by the stylus P or are double specified by the cursor (step S11 [Yes]), it is determined that specified minor name "$A_{11}$", "$B_{11}$", "$A_{11}$", "$B_{22}$", "$A_{22}$" or "$B_{22}$" is not in the display state based on the matrix elements (step S12 [No]).

Then, minor names "$A_{11}$", "$B_{11}$", "$A_{11}$", "$B_{22}$", "$A_{22}$", and "$B_{22}$" which are constituent elements of the multiplication result of partitioned matrices A and B are each replaced with corresponding matrix elements registered in the matrix name/matrix element replacement data area 12d, and are displayed (step S18).

Thereby, it is possible for the user (student) to easily learn, even when the user (student) is a beginner who cannot determine at which part of a determinant partition should be carried out, and cannot find the calculation procedure after changing the matrices into partitioned matrices, a procedure for efficiently carrying out a calculation by using partitioned matrices.

It should be noted that in each of the above-mentioned examples, although the case where partitioned matrices A and B are created to carry out a calculation of a product with respect to a multiplication formula of square matrices A and B has been described, even in the case of a multiplication formula of matrices A and B which are not square matrices, it is possible to learn an efficient calculation procedure using partitioned matrices by executing the matrix calculation processing identical to the aforementioned examples.

Another Example

Figure 5:
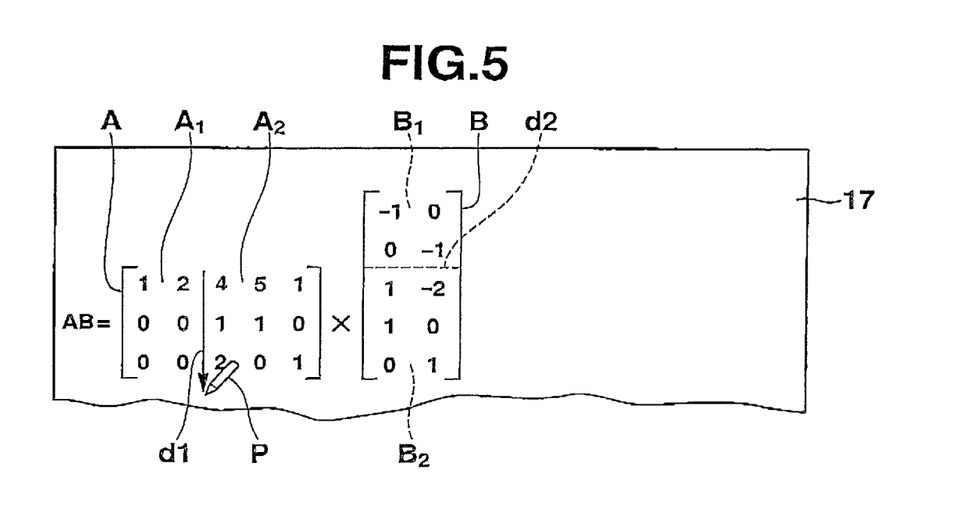
FIG. 5 is a view showing a partitioned matrix calculation/display operation of another example concomitant with the matrix calculation processing to be carried out by the touchpanel information terminal device (tablet computer 10P) 10.

FIG. 5 is a view showing a partitioned matrix calculation/display operation of another example concomitant with the matrix calculation processing to be carried out by a touchpanel information terminal device (tablet computer 10E) 10.

That is, in a state where matrix elements of a matrix A (3×5) on the left side, a multiplication sign "×", and matrix elements of a matrix B (5×2) on the right side are sequentially input as a calculating formula of a product of the matrices A and B as shown in FIG. 5 (steps S1 and S2), when a first parting line d1 configured to partition the left matrix A into a minor $A_1$ of two columns, and minor $A_2$ of three columns is input and displayed by a stylus P or by a cursor operation in order to carry out a calculation using partitioned matrices (step S3 [Yes]), it is determined that the matrix to which the first parting line d1 is input is matrix A on the left side of multiplication (step S4

[Yes]), and it is further determined that the first parting line d1 is a parting line configured to partition the columns (step S5*a* [Yes]).

Then, on the basis of a definition of a product of matrices stating that the number of columns of a left matrix and the number of rows of a right matrix be equal to each other, a second parting line d2 configured to partition the right matrix B into minors B$_1$ including two rows and B$_2$ including three rows is distinguishably displayed (step S6*a*).

Thereby, even in the case of a calculating formula of a product of matrices A and B which are not square matrices, when the first parting line d1 is input to the one matrix A by an operation of the user (student), a second parting line d2 is input to the other matrix B at an appropriate position thereof and displayed simultaneously with the input of the first parting line d1, whereby it is possible to create correct partitioned matrices A and B conforming to the definition of the product of matrices.

After this too, like the case of each of the aforementioned examples, confirmation of the combination of multiplication of the minors between the created partitioned matrices A and B, simplification of the multiplication formula achieved by replacement with a minor name or a unit matrix symbol "I"/zero matrix symbol "0" corresponding to each minor, execution of a calculation using the simplified multiplication formula, processing of conversion into matrix elements corresponding to the calculation result, and the like are sequentially carried out, whereby it is easily possible to learn a procedure for efficiently carrying out a calculation by using partitioned matrices.

Therefore, according to the information terminal device 10 provided with a creation function, calculation function, and display function of the partitioned matrices, and configured as described previously, when a matrix multiplication formula including a matrix A of n×n or n×m, multiplication sign "×", and matrix B of n×n or n×m is input and displayed, and a first parting line d1 configured to partition columns is input and displayed in the case of matrix A on the left side of the multiplication, or a first parting line d1 configured to partition rows is input and displayed in the case of matrix B on the right side of the multiplication, then, on the basis of a definition of a product of matrices stating that the number of columns of a left matrix and the number of rows of a right matrix be equal to each other, a second parting line d2 configured to partition the rows of the right matrix B or a second parting line d2 configured to partition the columns of the left matrix A is distinguishably displayed, whereby a multiplication formula based on partitioned matrices A and B is created and displayed.

Thereby, when a first parting line d1 is input to one matrix A (B) by an operation of the user (student), a second parting line d2 is input to the other matrix B (A) at an appropriate position thereof, and is displayed simultaneously with the input of the first parting line d1, and it is therefore possible to create correct partitioned matrices A and B conforming to the definition of the product of matrices, and learn an efficient calculation procedure using partitioned matrices.

Further, according to the information terminal device 10 provided with a creation function, calculation function, and display function of the partitioned matrices, and configured as described previously, it is possible to create a minor name of each of minors constituting the created partitioned matrices by adding a subscript corresponding to a matrix position of each of the minors in the partitioned matrix to a matrix-name of the partitioned matrix to which the minor belongs, and display the minors by replacing the matrix elements of the minors with the minor names of the minors. At this time, when the matrix elements of the minor which are the object of replacement constitute a unit matrix, the matrix elements are replaced with a unit matrix symbol "I" to be displayed and, when the matrix elements constitute a zero matrix, the matrix elements are replaced with a zero matrix symbol "0" to be displayed.

Thereby, it is possible for the user (student) to display partitioned matrices A and B in a simplifying manner by replacing the minors of the created partitioned matrices A and B with the minor names corresponding to the minors, by replacing the unit matrix with the unit matrix symbol "I", and by replacing the zero matrix with the zero matrix symbol "0".

Further, according to the information terminal device 10 provided with a creation function, calculation function, and display function of the partitioned matrices, and configured as described previously, it is possible to execute a calculation of a product of the partitioned matrices in a state where the minors of the created partitioned matrices are replaces with minor names, unit matrix symbols "I", and zero matrix symbols "0" and, after this, display each of the minor names constituting the calculation result by converting the minor name into the matrix elements before being replaced with the minor name.

Accordingly, in calculating a product of matrices, it becomes possible to learn a procedure for efficiently carrying out a calculation by using partitioned matrices.

It should be noted that each of the methods of the processing items to be carried out by the touchpanel information terminal device 10 described in the aforementioned examples, i.e., the matrix calculation processing (part 1) shown in the flowchart of FIG. 2A, matrix calculation processing (part 2), and the like shown in the flowchart of FIG. 2B can be stored in an external storage medium 13 such as a memory card (ROM card, RAM card, and the like), magnetic disk (floppy disk, hard disk, and the like), optical disc (CD-ROM, DVD, and the like), semiconductor memory, and the like as a program which can be executed by a computer, and can be distributed. Further, a computer of an electronic device provided with a touchpanel display section (17) reads the program stored in the external storage medium 13 into the storage device (12), and the operation is controlled by the read program, whereby it is possible to realize the creation function, calculation function, and display function of the partitioned matrices described in the examples, and execute the identical processing by the aforementioned method.

Further, the data of the program configured to realize the aforementioned methods can be transmitted on a network N in a form of a program code, and by capturing the program data on a computer of an electronic device connected to the network N, and provided with a touchpanel display section (17) by means of a communication section 15, it is possible to realize the aforementioned creation function, calculation function, and display function of the partitioned matrices.

The present invention is not limited to the aforementioned embodiments, and can be variously modified in the implementation stage within a range not deviating from the essence of the invention. Furthermore, inventions of various stages are included in the examples, and by appropriately combining a plurality of disclosed configuration elements with each other, various inventions can be extracted. For example, even when some configuration elements are deleted from all the configuration elements shown in the embodiments or some configuration elements are combined in a different form, if the problem described in the paragraph of the problem to be solved can be solved, and the advantage described in the paragraph of the advantage of the invention can be obtained, the configuration after deletion of the configuration elements or the combined configuration can be extracted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A matrix calculation device comprising:
a matrix multiplication formula display unit configured to display on a display section a matrix multiplication formula including a left matrix having matrix elements of a plurality of columns, a right matrix having matrix elements of a plurality of rows, and a multiplication sign between the left matrix and the right matrix;
a matrix partitioning unit configured to partition one matrix from among the left and right matrices of the matrix multiplication formula displayed by the matrix multiplication formula display unit into a plurality of first minors in accordance with a user operation;
a partition position determination unit configured to determine, based on a partition position where said one matrix has been partitioned into the plurality of first minors by the matrix partition unit and based on a definition of a product of matrices, a partition position where the other of the left and right matrices is to be partitioned into a plurality of second minors;
a minor specifying unit configured to specify minors which are any ones of (i) the plurality of first minors into which said one matrix has been partitioned by the matrix partitioning unit, and (ii) the plurality of second minors into which the other matrix is to be partitioned at the partition position determined by the partition position determination unit, in accordance with a user operation; and
a minor replacement/display unit configured to replace matrix elements corresponding to the minors specified by the minor specifying unit with respective minor names which are formed by adding subscripts corresponding to matrix positions of the minors to matrix names of the matrices to which the minors belong, and to display the respective minor names.

2. The matrix calculation device according to claim 1, wherein the matrix partitioning unit specifies a column position of the left matrix of the matrix multiplication formula displayed by the matrix multiplication formula display unit to partition the left matrix into left and right first minors, and
wherein the partition position determination unit determines, based on the column position of the left matrix specified by the matrix partitioning unit and based on the definition of the product of matrices, a row position of the same number as the column position of the left matrix as a partition position of the right matrix.

3. The matrix calculation device according to claim 1, wherein the matrix partitioning unit specifies a row position of the right matrix of the matrix multiplication formula displayed by the matrix multiplication formula display unit to partition the right matrix into upper and lower first minors, and
wherein the partition position determination unit determines, based on the row position of the right matrix specified by the matrix partitioning unit and based on the definition of the product of matrices, a column position of the same number as the row position of the right matrix as a partition position of the left matrix.

4. The matrix calculation device according to claim 1, wherein the minor replacement/display unit further comprises:
a minor determination unit configured to determine, based on matrix elements of a minor specified by the minor specifying unit, whether or not the minor is a unit matrix, and whether or not the minor is a zero matrix;
a unit matrix replacement/display unit configured to, when it is determined by the minor determination unit that the specified minor is the unit matrix, replace the matrix elements of the minor with a unit matrix symbol to display the unit matrix symbol; and
a zero matrix replacement/display unit configured to, when it is determined by the minor determination unit that the specified minor is the zero matrix, replace the matrix elements of the minor with a zero matrix symbol to display the zero matrix symbol,
wherein when it is determined by the minor determination unit that the specified minor is neither the unit matrix nor the zero matrix, the minor replacement/display unit replaces the matrix elements of the minor with a minor name formed by adding a subscript corresponding to a matrix position of the minor to a matrix name of a matrix to which the minor belongs to display the minor name.

5. The matrix calculation device according to claim 4, further comprising:
a matrix multiplication unit configured to execute multiplication of the left matrix and the right matrix in a state where each of the minors of the matrices is replaced with one of a corresponding minor name, the unit matrix symbol, and the zero matrix symbol;
a multiplication result display unit configured to display a multiplication result of the multiplication executed by the matrix multiplication unit on the display section; and
a multiplication result conversion unit configured to convert a minor name included in the multiplication result displayed by the multiplication result display unit into matrix elements before being replaced with the minor name by the minor replacement/display unit, and display the matrix elements.

6. The matrix calculation device according to claim 1, further comprising:
a first partition position display unit configured to distinguishably display the partition position of the one matrix partitioned by the matrix partitioning unit; and
a second partition position display unit configured to distinguishably display the partition position of the other matrix determined by the partition position determination unit.

7. A matrix calculation method for use in an electronic device provided with a display section, the method comprising:
displaying on the display section a matrix multiplication formula including a left matrix having matrix elements of a plurality of columns, a right matrix having matrix elements of a plurality of rows, and a multiplication sign between the left matrix and the right matrix;
partitioning one matrix from among the left and right matrices of the displayed matrix multiplication formula into a plurality of first minors in accordance with a user operation;
determining, based on a partition position, where said one matrix has been partitioned into the plurality of first minors and based on a definition of a product of matrices, a partition position where the other of the left and right matrices is to be partitioned into a plurality of second minors;

specifying minors which are any ones of (i) the plurality of first minors into which said one matrix has been partitioned, and (ii) the plurality of second minors into which the other matrix is to be partitioned at the determined partition position, in accordance with a user operation; and replacing matrix elements corresponding to the specified minors with respective minor names which are formed by adding subscripts corresponding to matrix positions of the minors to matrix names of the matrices to which the minors belong, and displaying the respective minor names.

8. A non-transitory computer-readable storage medium having stored thereon a matrix calculation program which controls a computer of an electronic device provided with a display section, the program causing the computer to perform functions comprising:

displaying on the display section a matrix multiplication formula including a left matrix having matrix elements of a plurality of columns, a right matrix having matrix elements of a plurality of rows, and a multiplication sign between the left matrix and the right matrix;

partitioning one matrix from among the left and right matrices of the displayed matrix multiplication formula into a plurality of first minors in accordance with a user operation;

determining, based on a partition position where said one matrix has been partitioned into the plurality of first minors and based on a definition of a product of matrices, a partition position where the other of the left and right matrices is to be partitioned into a plurality of second minors;

specifying minors which are any ones of (i) the plurality of first minors into which said one matrix has been partitioned, and (ii) the plurality of second minors into which the other matrix is to be partitioned at the determined partition position, in accordance with a user operation; and replacing matrix elements corresponding to the specified minors with respective minor names which are formed by adding subscripts corresponding to matrix positions of the minors to matrix names of the matrices to which the minors belong, and displaying the respective minor names.

\* \* \* \* \*